United States Patent
Arakkal et al.

(10) Patent No.: US 11,144,302 B2
(45) Date of Patent: Oct. 12, 2021

(54) METHOD AND SYSTEM FOR CONTRAINDICATING FIRMWARE AND DRIVER UPDATES

(71) Applicant: EMC IP Holding Company LLC, Hopkinton, MA (US)

(72) Inventors: Rajeev Arakkal, Bangalore (IN); Sajna N Shetty, Bangalore (IN); Felix Stephen Anthuvan, Dharmapuri (IN); Jagadeesh Nerambol Voovaiah, Bangalore (IN); Shrinidhi Katte, Bangalore (IN); Sachin Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/670,682

(22) Filed: Oct. 31, 2019

(65) Prior Publication Data
US 2021/0132936 A1 May 6, 2021

(51) Int. Cl.
G06F 8/65 (2018.01)
G06F 8/61 (2018.01)
G06N 7/00 (2006.01)
G06N 3/08 (2006.01)
G06N 3/04 (2006.01)
G06N 20/00 (2019.01)

(52) U.S. Cl.
CPC .......... *G06F 8/65* (2013.01); *G06F 8/61* (2013.01); *G06N 3/04* (2013.01); *G06N 3/08* (2013.01); *G06N 7/005* (2013.01); *G06N 20/00* (2019.01)

(58) Field of Classification Search
USPC ........................................ 717/168
See application file for complete search history.

(56) References Cited

U.S. PATENT DOCUMENTS

| | | | |
|---|---|---|---|
| 10,032,114 B2 * | 7/2018 | Baldini Soares | G06N 5/04 |
| 10,789,057 B2 * | 9/2020 | Vichare | G06F 8/60 |
| 2016/0014149 A1 * | 1/2016 | Bradley | H04L 63/1425 726/14 |
| 2019/0205542 A1 * | 7/2019 | Kao | G06Q 10/0635 |
| 2019/0354366 A1 * | 11/2019 | Lam | G06F 21/572 |
| 2019/0370657 A1 * | 12/2019 | Chen | G06N 3/082 |
| 2020/0034133 A1 * | 1/2020 | Dattatri | G06F 8/61 |
| 2020/0074321 A1 * | 3/2020 | Chungapalli | G06K 9/6262 |

OTHER PUBLICATIONS

Cmielowski, L., "Adoption of machine learning to software failure prediction", Retrieved from URL: https://medium.com/ibm-data-science-experience/adoption-of-machine-learning-to-software-failure-prediction-e8d85ed0338f, Oct. 20, 2017.

* cited by examiner

*Primary Examiner* — Wei Y Zhen
*Assistant Examiner* — Clint Thatcher
(74) *Attorney, Agent, or Firm* — Chamberlain, Hrdlicka, White, Williams & Aughtry

(57) ABSTRACT

A method and system for contraindicating firmware and driver updates. Specifically, the disclosed method and system entail discerning whether installation of a hardware device firmware and/or device driver update, targeting a hardware device on a host device, would succeed or fail given a set of features (or indicators) reflective of the current host device state and metadata respective to the hardware device update. Further, the determination may employ predictive machine learning techniques.

14 Claims, 5 Drawing Sheets

METHOD AND SYSTEM FOR CONTRAINDICATING FIRMWARE AND DRIVER UPDATES

BACKGROUND

Device firmware and/or device driver updates, in enterprise datacenter environments, often entail extensive and complex installations. More so, multiple issues, such as incompatibilities and malfunctions, may result from these installations.

SUMMARY

In general, in one aspect, the invention relates to a method for installing hardware device updates, comprising: receiving a first hardware device update concerning a first hardware device on a host device; submitting a first feature set, pertinent to predicting an installation outcome for the first hardware device update, for processing; receiving, following the processing, a first predicted update outcome for the first hardware device update; and attempting, based on the first predicted update outcome, an installation of the first hardware device update onto the host device.

In general, in one aspect, the invention relates to a non-transitory computer readable medium (CRM) comprising computer readable program code, which when executed by a computer processor, enables the computer processor to: receive a first hardware device update concerning a first hardware device on a host device; submit a first feature set, pertinent to predicting an installation outcome for the first hardware device update, for processing; receive, following the processing, a first predicted update outcome for the first hardware device update; and attempt, based on the first predicted update outcome, an installation of the first hardware device update onto the host device.

In general, in one aspect, the invention relates to a system, comprising: a plurality of host devices comprising a host device comprising a hardware device; and an update agent executing on the host device and programmed to: receive a hardware device update concerning the hardware device; submit a feature set, pertinent to predicting an installation outcome for the hardware device update, for processing; receive, following the processing, a predicted update outcome for the hardware device update; and attempt, based on the predicted update outcome, an installation of the hardware device update onto the host device.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for contraindicating firmware and driver updates. Specifically, one or more embodiments of the invention entails discerning whether installation of a hardware device firmware and/or device driver update, targeting a hardware device on a host device, would succeed or fail given a set of features (or indicators) reflective of the current host device state and metadata respective to the hardware device update. Further, the determination may employ predictive machine learning techniques.

Figure 1:
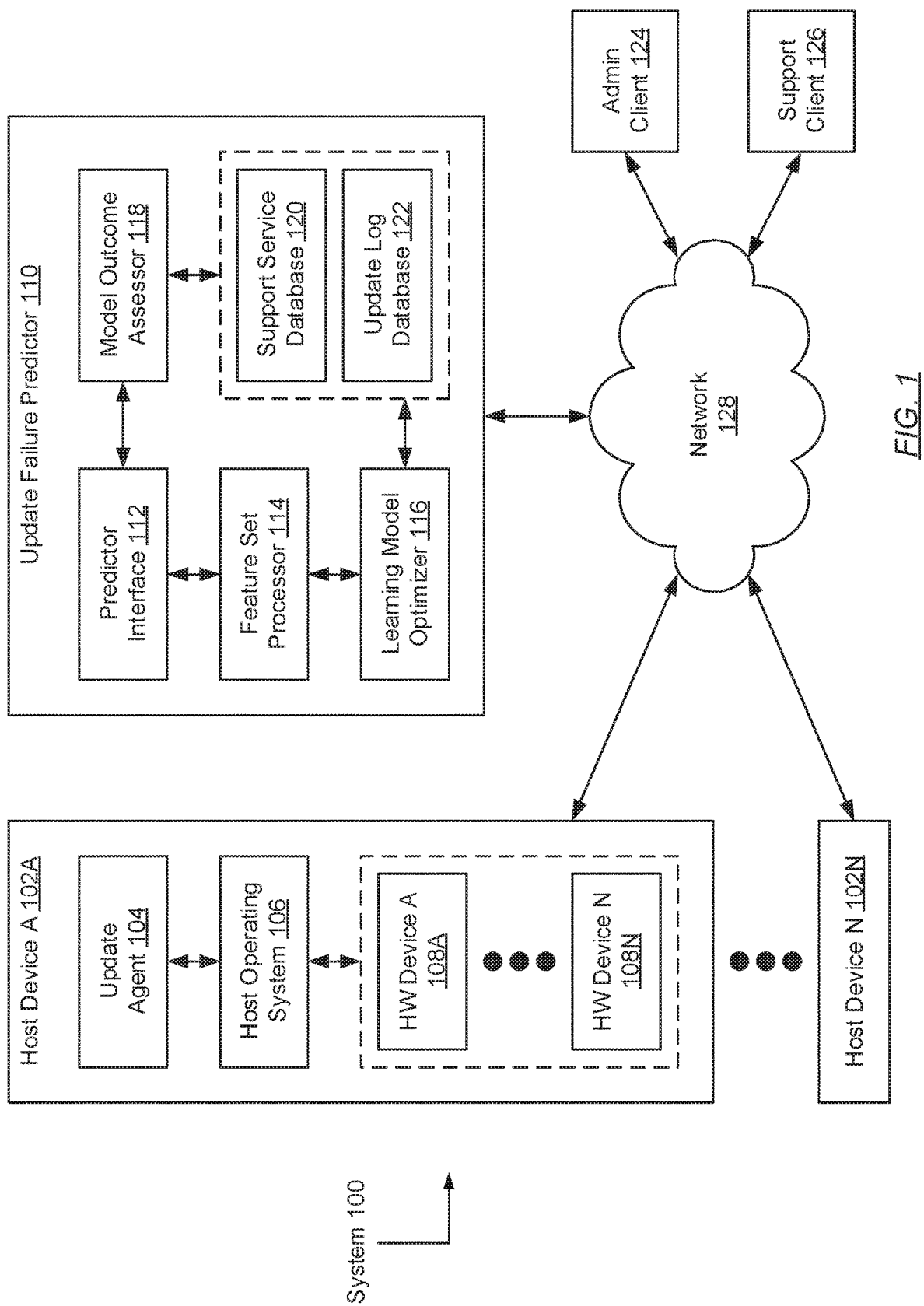
FIG. 1 shows a system in accordance with one or more embodiments of the invention.

FIG. 1 shows a system in accordance with one or more embodiments of the invention. The system (100) may include one or more host devices (102A-102N), an update failure predictor (110), an admin client (124), and a support client (126). Each of these system (100) components is described below.

In one embodiment of the invention, the above-mentioned system (100) components may operatively connect to one another through a network (128) (e.g., a local area network (LAN), a wide area network (WAN) such as the Internet, a mobile network, any other network type, or a combination thereof). The network (128) may be implemented using any combination of wired and/or wireless connections. Further, the network (128) may encompass various interconnected, network-enabled components (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a host device (102A-102N) may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over the network (128). Further, in providing an execution environment for any computer programs installed thereon, a host device (102A-102N) may include and allocate various resources (e.g., computer processors, memory, storage, virtualization, network bandwidth, etc.), as needed, to the computer program(s) and the task(s) (or process(es)) instantiated thereby. One of ordinary skill will appreciate that a host device (102A-102N) may perform other functionalities without departing from the scope of the invention. Examples of a host device (102A-102N) may include, but are not limited to, a desktop computer, a workstation computer, a server, a mainframe, or any other computing system similar to the exemplary computing system shown in FIG. 5. Moreover, a host device (102A-102N) may include an update agent (104), a host operating system (106), and one or more hardware (HW) devices (108A-108N). Each of these host device (102A-102N) subcomponents is described below.

In one embodiment of the invention, the update agent (104) may refer to a computer program that may execute on the underlying hardware (e.g., the hardware device(s) (108A-108N)) of a respective host device (102A-102N). Specifically, the update agent (104) may be designed and configured to manage the installation of hardware device updates (described below) on the respective host device (102A-102N). To that extent, the update agent (104) may perform the various steps outlined below with respect to FIG. 2, which may be directed to requesting update failure predictions for any hardware device updates awaiting installation. Further, one of ordinary skill will appreciate that the update agent (104) may perform other functionalities without departing from the scope of the invention.

In one embodiment of the invention, a hardware device update may refer to minor or significant changes applicable to the firmware or device drivers for a given hardware device (108A-108N). Firmware may refer to computer readable program code (or instructions) that may be stored and executes on the given hardware device (108A-108N), and enables the given hardware device (108A-108N) to operate and communicate with other host device (102A-102N) subcomponents according to the intended purposes of the hardware device manufacturer. Meanwhile, a device driver may refer to computer readable program code (or instructions) that may be stored inside and may be executed by the host operating system (106), and enables the host operating system (106) to interact with and control the given hardware device (108A-108N).

In one embodiment of the invention, the above-mentioned changes, applicable to the firmware or device drivers for a given hardware device (108A-108N), may impact the functionality of the given hardware device (108A-108N), the resources provided by the given hardware device (108A-108N), and/or the interactivity between the given hardware device (108A-108N) and other host device (102A-102N) subcomponents—both physical and logical. Furthermore, any hardware device update may provide patches or fixes addressing existing issues exhibited by the firmware or device drivers for the given hardware device (108A-108N) or, alternatively, may introduce and implement new capabilities and/or features performable by the given hardware device (108A-108N).

In one embodiment of the invention, the host operating system (106) may refer to a computer program that may execute on the underlying hardware of a respective host device (102A-102N). Specifically, the host operating system (106) may be responsible for managing a utilization of the hardware device(s) (108A-108N) by the various logical (or software) components (e.g., user programs (not shown), update agent (104), etc.), including itself, which may be executing on the respective host device (102A-102N). By way of examples, the host operating system (106) may include functionality to: support fundamental host device (102A-102N) functionality; schedule tasks; allocate host device (102A-102N) resources; execute or invoke other computer programs; and control the hardware device(s) (108A-108N). Furthermore, towards controlling and managing the utilization of the hardware device(s) (108A-108N), the host operating system (106) may include further functionality to store and execute device drivers (described above) pertinent to operating and communicating with the hardware device(s) (108A-108N). Moreover, one of ordinary skill will appreciate that the host operating system (106) may perform other functionalities without departing from the scope of the invention.

In one embodiment of the invention, a hardware device (108A-108N) may refer to a physical and/or tangible component of a respective host device (102A-102N) that includes at least a circuit board, an integrated circuit, or any other electronics format. Further, a hardware device (108A-108N) may enable and provide the framework and resources on which various logical components (e.g., software) of the respective host device (102A-102N) may operate. The extent of the framework, resources, interactivity, and overall operation of a hardware device (108A-108N) may be governed by the firmware (described above) embedded on and executed by the hardware device (108A-108N). Examples of a hardware device (108A-108N) may include, but are not limited to, a computer processor (e.g., a central processing unit (CPU), a graphics processing unit (GPU), etc.), memory (e.g., volatile and non-volatile), a non-transitory computer readable media reader and/or writer (e.g., a hard disk drive (HDD), a solid state drive (SSD), a compact disc read-only memory (CD-ROM) drive, a flash memory drive, etc.), a cooling fan, a network card or adapter, a motherboard, a power supply, a video or graphics card, an audio card, a keyboard, a mouse, a monitor, etc.

In one embodiment of the invention, the update failure predictor (110) may represent a service directed to forecasting outcomes concerning the installation of hardware device firmware and/or device driver updates on host devices (102A-102N). Specifically, the update failure predictor (110) may be at least designed and configured to optimized a predictive learning model (see e.g., FIG. 3) and process update failure prediction requests (see e.g., FIG. 4). One of ordinary skill, however, will appreciate that the update failure predictor (110) may perform other functionalities without departing from the scope of the invention.

In one embodiment of the invention, the update failure predictor (110) may be implemented using one or more servers (not shown). Each server may reflect a physical server that may reside in a datacenter, or a virtual server, which may reside in a cloud computing environment. Additionally or alternatively, the update failure predictor (110) may be implemented using one or more computing systems similar to the exemplary computing system shown in FIG. 5.

Furthermore, the update failure predictor (110) may include a predictor interface (112), a feature set processor (114), a learning model optimizer (116), a model outcome assessor (118), a support service database (120), and an update log database (122). Each of these update failure predictor (110) subcomponents is described below.

In one embodiment of the invention, the predictor interface (112) may refer to a logical interface or interactivity protocol, which may be designed and configured to facilitate communications between the update failure predictor (110) and external entities (e.g., the host device(s) (102A-102N), the admin client (124), and/or the support client (126)). To that extent, the predictor interface (112) may include functionality to: receive update failure prediction requests from the host device(s) (102A-102N), where the update failure prediction requests may pertain to ascertaining predicted update outcomes (e.g., predicted to be successful or predicted to fail) for given firmware or device driver updates awaiting installation on the host device(s) (102A-102N); extract feature sets enclosed with the received update failure prediction requests, where the feature sets each reflect a series of values representative of various hardware device and/or update relevant indicators collected during the generation time of the respective update failure prediction request; delegate the extracted feature sets to the feature set processor (114) for processing using an optimized predictive learning model; obtain predicted update outcomes from the feature set processor (114) following the aforementioned processing; issue update failure replies to the respective client device(s) (102A-102N) in response to the received update failure prediction requests, where the update failure replies may include the obtained predicted update outcomes; receive update failure results from the host device(s) (102A-102N) following the installation of given firmware or device driver updates on the host device(s) (102A-102); extract actual update outcomes enclosed with the received update failure results, where the actual update outcomes each reflect a true recorded outcome (e.g., successfully installed, failed to install, etc.) of the installation of a given firmware or device driver update on the host device(s) (102A-102N); and delegate the extracted actual update outcomes to the model output assessor (118) for processing. Further, one of ordinary skill will appreciate that the predictor interface (112) may perform other functionalities without departing from the scope of the invention.

In one embodiment of the invention, the feature set processor (114) may refer to a computer program that may execute on the underlying hardware of the update failure predictor (110). Specifically, the feature set processor (114) may be designed and configured to analyze feature sets (described above) in order to predict the outcomes of installing given firmware or device driver updates on the host device(s) (102A-102N). To that extent, the feature set processor (114) may include functionality to: obtain feature sets from the predictor interface (112); process the obtained feature sets using an optimized predictive learning model, to obtain predicted update outcomes; and provide the obtained predicted update outcomes to the predictor interface (112). Further, one of ordinary skill will appreciate that the feature set processor (114) may perform other functionalities without departing from the scope of the invention.

In one embodiment of the invention, the learning model optimizer (116) may refer to a computer program that may execute on the underlying hardware of the update failure predictor (110). Specifically, the learning model optimizer (116) may be designed and configured to optimize (i.e., train and validate) one or more predictive learning models. A predictive learning model may generally refer to a machine learning algorithm (e.g., an artificial neural network, a naïve Bayes classifier, etc.) that may be used in data prediction applications. To that extent, the learning model optimizer (116) may include functionality to perform the various steps outlined below with respect to FIG. 3, which may be directed to predicted learning model optimization. Further, one of ordinary skill will appreciate that the learning model optimizer (116) may perform other functionalities without departing from the scope of the invention.

In one embodiment of the invention, the model outcome assessor (118) may refer to a computer program that may execute on the underlying hardware of the update failure predictor (110). Specifically, the model outcome assessor (118) may be designed and configured to maintain the update log database (122). To that extent, the model outcome assessor (118) may include functionality to: obtain feature sets and actual update outcomes (both described above) from the predictor interface (112); adjoin the feature sets to their respective actual update outcomes to generate new feature-class tuples; and update the update log database (122) to include the generated new feature-class tuples, where the new and existing feature-class tuples may collectively be used in the adaptive optimization of the predictive learning model(s). Further, one of ordinary skill will appreciate that the model outcome assessor (118) may perform other functionalities without departing from the scope of the invention.

In one embodiment of the invention, the support service database (120) may refer to a data repository dedicated to storing failure and issue data concerning firmware and device driver updates, which may be aggregated from various help desk support channels (e.g., user reporting and/or feedback, technical support ticketing systems, social media postings, recorded toll-free number calls, etc.). The support service database (120) may be populated or updated by the support client (126) (described below). Meanwhile, the update log database (122) may refer to a data repository dedicated to storing observed results (both successful and failed) derived from the installation of firmware and device driver updates on the host device(s) (102A-102N). The update log database (122) may be populated or updated by the model outcome assessor (118) (described above).

In one embodiment of the invention, the support service database (120) and the update log database (122) may each be implemented using one or more physical storage devices (not shown). The physical storage device(s) may or may not be of the same type or co-located in a same server, at least in part, implementing the update failure predictor (110). Further, the data consolidated in the support service database (120) and the update log database (122) may be arranged using any storage mechanism (e.g., a filesystem, a collection of tables or records, etc.). Moreover, each physical storage device may include persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the admin client (124) may represent any physical computing system operated by one or more administrators of the host device(s) (102A-102N). An administrator of the host device(s) (102A-102N) may refer to an individual or entity whom may be responsible for overseeing host device (102A-102N) operations and maintenance. Further, the admin client (124) may include functionality to: receive predicted update outcomes from the update failure predictor (110); and manage (i.e., allow or disallow) the installation of hardware device updates based on the received predicted update outcomes. Each predicted update outcome may represent a prediction on whether a given firmware and/or device driver update, targeting a given hardware device (108A-108N) on a given host device (102A-102N), would succeed or fail based on a feature set of indicators. One of ordinary skill will appreciate that the admin client (124) may perform other functionalities without departing from the scope of the invention. Examples of the admin client (124) may include, but are not limited to, a desktop computer, a laptop computer, a tablet computer, a workstation computer, a server, a mainframe, a smartphone, or any other computing system similar to the exemplary computing system shown in FIG. 5.

In one embodiment of the invention, the support client (126) may represent any physical computing system operated by one or more support specialists for the host device(s) (102A-102N). A support specialist for the host device(s) (102A-102N) may refer to an individual or entity whom may be responsible for troubleshooting problems and other issues inflicting the host device(s) (102A-102N). Further, the support client (126) may include functionality to: aggregate failure and issue data concerning firmware and device driver updates from various help desk support channels (e.g., user reporting and/or feedback, technical support ticketing systems, social media postings, recorded toll-free number calls, etc.); populate or update the support service database (120) using the aggregated failure and issue data; receive reports detailing positive update failures (e.g., failed hardware device updates, which may or may not have been predicted to succeed) from the update failure predictor (110); and disseminate global resolutions addressing current and/or future hardware device updates based on the received reports. One of ordinary skill will appreciate that the support client (126) may perform other functionalities without departing from the scope of the invention. Examples of the support client (126) may include, but are not limited to, a desktop computer, a laptop computer, a tablet computer, a workstation computer, a server, a mainframe, a smartphone, or any other computing system similar to the exemplary computing system shown in FIG. 5.

While FIG. 1 shows a configuration of components, other system (100) configurations may be used without departing from the scope of the invention.

Figure 2:
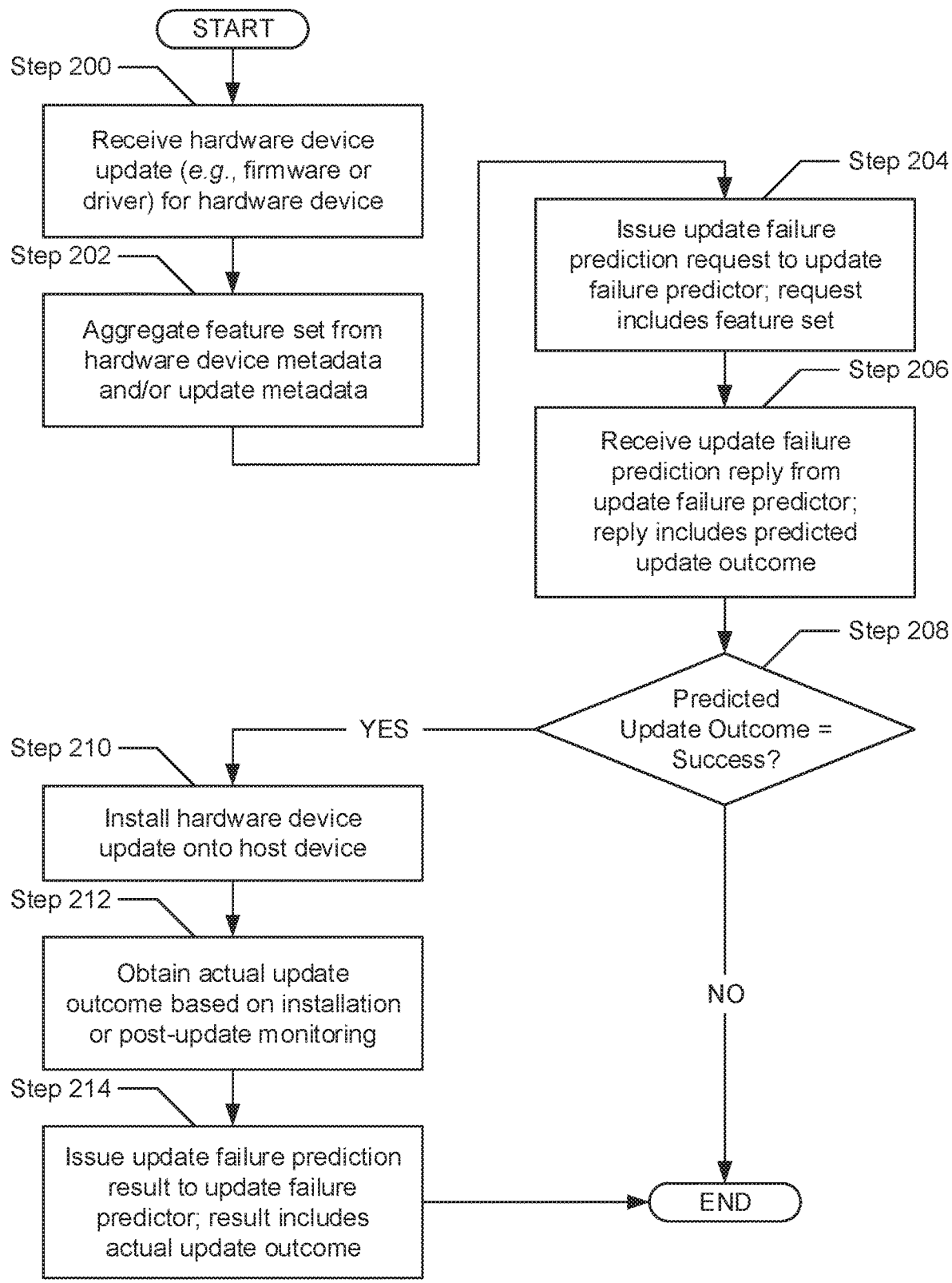
FIG. 2 shows a flowchart describing a method for requesting an update failure prediction in accordance with one or more embodiments of the invention.

FIG. 2 shows a flowchart describing a method for requesting an update failure prediction in accordance with one or more embodiments of the invention. The various steps outlined below may be performed by the update agent on a host device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a hardware device update is received. In one embodiment of the invention, the hardware device update may target a given hardware device residing on the host device. Further, the hardware device update may encompass computer readable program code (or instructions) that may implement significant changes to firmware or a device driver (described above) (see e.g., FIG. 1) of the given hardware device.

In Step 202, a feature set is aggregated. In one embodiment of the invention, the feature set may refer to a collection (e.g., array or vector) of values—each representative of a different feature pertinent to predicting the installation outcome of the hardware device update (received in Step 200) on the host device. A feature, in turn, may represent an individual measurable property or indicator reflective of hardware device metadata descriptive of the given hardware device or hardware device update metadata descriptive of the hardware device update. Examples of features, for which values may be aggregated to obtain the feature set, may include, but are not limited to, a version name or number assigned to the hardware device update, a storage or memory space size that may be consumed to store and/or apply the hardware device update, a design architecture associated with the hardware device update, a name and/or version assigned to the host operating system executing on the host device, a name and/or description associated with the given hardware device, a name associated with a manufacturer of the given hardware device, a version name or number assigned to the existing (or current) hardware device firmware or device driver installed on the host device, a name and/or version assigned to one or more dependencies (i.e., physical or logical host device components that should be pre-installed prior to attempting the hardware device update installation process) of the hardware device update, a name associated with a manufacturer of the aforementioned one or more dependencies, etc. Moreover, the features, representative of the feature set, are not limited to the aforementioned examples.

In Step 204, an update failure prediction request is issued. In one embodiment of the invention, the update failure prediction request may be directed to the update failure predictor (see e.g., FIG. 1). Further, the update failure prediction request may include the feature set (aggregated in Step 202).

In Step 206, in response to the update failure prediction request (issued in Step 204), an update failure prediction reply is received from the update failure predictor. In one embodiment of the invention, the update failure prediction request may include a predicted update outcome. The predicted update outcome may, for example, be expressed as one of various prescribed labels (i.e., character strings) (e.g., "success", "failure", etc.) indicating the predicted installation outcome of the hardware device update (received in Step 200) onto the host device given the feature set (aggregated in Step 202). Furthermore, predicted update outcomes are not limited to the aforementioned examples of, nor being generally expressed as, prescribed labels.

In Step 208, a determination is made as to whether the predicted update outcome (received in Step 206) reflects a positive (e.g., "success") predicted installation outcome of the hardware device update on the host device. In one embodiment of the invention, if it is determined that a positive installation outcome is predicted to transpire, then the process proceeds to Step 210. On the other hand, in another embodiment of the invention, if it is alternatively determined that a negative (e.g., "failure") installation outcome is predicted to transpire, then the process alternatively ends.

In Step 210, upon determining (in Step 208) that the predicted update outcome (received in Step 206) reflects a positive predicted installation outcome for the hardware device update (received in Step 200), an installation of the hardware device update onto the host device is attempted. In one embodiment of the invention, the installation attempt may entail executing the computer readable program code (or instructions) representative of the hardware device update, thereby applying changes directed to rectifying or enhancing the existing firmware embedded on the given hardware device, or the device driver stored within the host operating system.

In Step 212, an actual update outcome is obtained following the completion or incompletion of the hardware device update installation (attempted in Step 210). The actual update outcome may, for example, be expressed as one of various prescribed labels (i.e., character strings) (e.g., "success—system reliable", "success—system faulty", "failure—operation timed out", "failure—compatibility issue", etc.) indicating the observed installation outcome of the hardware device update onto the host device.

That is, in one embodiment of the invention, installation of the hardware device update may successfully complete without observable short-term or long-term repercussions to the overall functionality of the host device, which may result in a "success—system reliable" labeled actual update outcome. In another embodiment of the invention, installation of the hardware device update may successfully complete with observable short-term or long-term repercussions to the overall functionality of the host device, which may result in a "success—system faulty" labeled actual update outcome. In yet another embodiment of the invention, installation of the hardware device update may unsuccessfully complete due to an installation timeout, which may result in a "failure—operation timed out" labeled actual update outcome. In still yet another embodiment of the invention, installation of the hardware device update may unsuccessfully complete due to a dependent component compatibility issue, which may result in a "failure—compatibility issue" labeled actual update outcome. Furthermore, actual update outcomes are not limited to the aforementioned examples of, nor being generally expressed as, prescribed labels.

In Step 214, an update failure prediction result is issued. In one embodiment of the invention, the update failure prediction result may be directed to the update failure predictor. Further, the update failure prediction result may include the actual update outcome (obtained in Step 212) for the installation of the hardware device update (attempted in Step 210).

Figure 3:
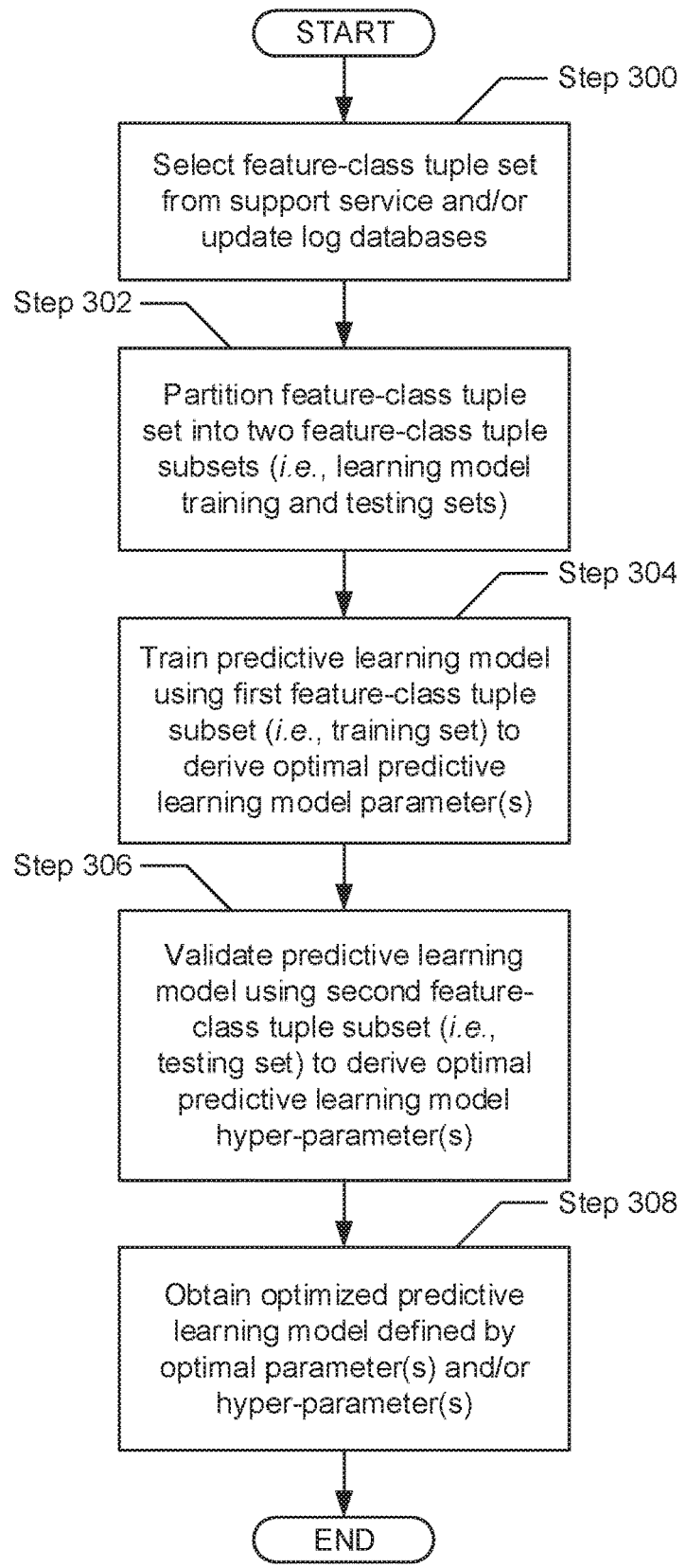
FIG. 3 shows a flowchart describing a method for optimizing a predictive learning model in accordance with one or more embodiments of the invention.

FIG. 3 shows a flowchart describing a method for optimizing a predictive learning model in accordance with one or more embodiments of the invention. The various steps outlined below may be performed by the update failure predictor (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a feature-class tuple set is selected from the data stored in the support service database and/or the update log database (described above) (see e.g., FIG. 1). In one embodiment of the invention, the feature-class tuple set may encompass a collection of feature-class tuples. Further, each feature-class tuple may refer to a finite ordered list (or sequence) of elements. The elements may include, but are not limited to, a feature set and an actual update outcome (both described above) (see e.g., FIG. 2) observed as a result of an attempted installation of a hardware device update onto a host device permitted to proceed based on the feature set.

In Step 302, the feature-class tuple set (selected in Step 300) is partitioned into two feature-class tuple subsets. In one embodiment of the invention, a first feature-class tuple subset may include a first portion of a cardinality (or number) of feature-class tuples in the feature-class tuple set, whereas a second feature-class tuple subset may include a second portion (or remainder) of the cardinality of feature-class tuples in the feature-class tuple set. Further, the first feature-class tuple subset may also be referred hereinafter as a learning model training set, while the second feature-class tuple subset may also be referred hereinafter as a learning model testing (or validation) set.

In one embodiment of the invention, the ratio of feature-class tuples forming the first feature-class tuple subset to feature-class tuples forming the second feature-class tuple subset may be determined based on system administrator preferences. Specifically, the aforementioned preferences may include a parameter—e.g., a percentage of data for training (PDT) parameter—expressed through a numerical value that specifies the percentage of the feature-class tuple set should be used for optimizing predictive learning model parameters (described below).

In Step 304, a predictive learning model (e.g., an artificial neural network, a naïve Bayes classifier, etc.) is trained using the first feature-class tuple subset (i.e., the learning model training set) (obtained in Step 302). In one embodiment of the invention, training the predictive learning model may result in the derivation of one or more optimal predictive learning model parameters. A predictive learning model parameter may refer to a model configuration variable that may be adjusted (or optimized) during a training runtime of the predictive learning model. By way of an example, a predictive learning model parameter, pertinent to a neural network based predictive learning model, may include the set of weights representative of the connection strengths between pairs of nodes structurally defining the model. Further, the derivation of the optimal predictive learning model parameter(s) may be possible through supervised learning, which refers to learning (or optimization) through the analyses of training examples and/or data.

In Step 306, the predictive learning model (trained in Step 304) is validated using the second feature-class tuple subset (i.e., the learning model testing set) (obtained in Step 302). In one embodiment of the invention, validating the predictive learning model may result in the derivation of one or more optimal predictive learning model hyper-parameters. A predictive learning model hyper-parameter may refer to a model configuration variable that may be adjusted (or optimized) outside or before the training runtime of the predictive learning model. That is, a predictive learning model hyper-parameter may represent a variable directed to the architecture design of the predictive learning model. By way of examples, predictive learning model hyper-parameters, pertinent to a neural network based predictive learning model, may include the number of hidden node layers and, accordingly, the number of nodes in each hidden node layer, between the input and output layers of the model; the activation function(s) used by the nodes of the model to translate their respective inputs to their respective outputs; the learning rate defining the speed of which the model updates its predictive learning model parameter(s) (described above); and the number of iterations or epochs defining the length of the training runtime of the model.

In Step 308, an optimized predictive learning model is defined using the optimal predictive learning model parameter(s) (derived in Step 304) and the optimal predictive learning model hyper-parameter(s) (derived in Step 306). In one embodiment of the invention, the optimized predictive learning model may represent a tuned predictive learning model inferred from example input-output pairs (e.g., the learning model training and testing sets), which may exhibit acceptable prediction performance and accuracy.

Figure 4:
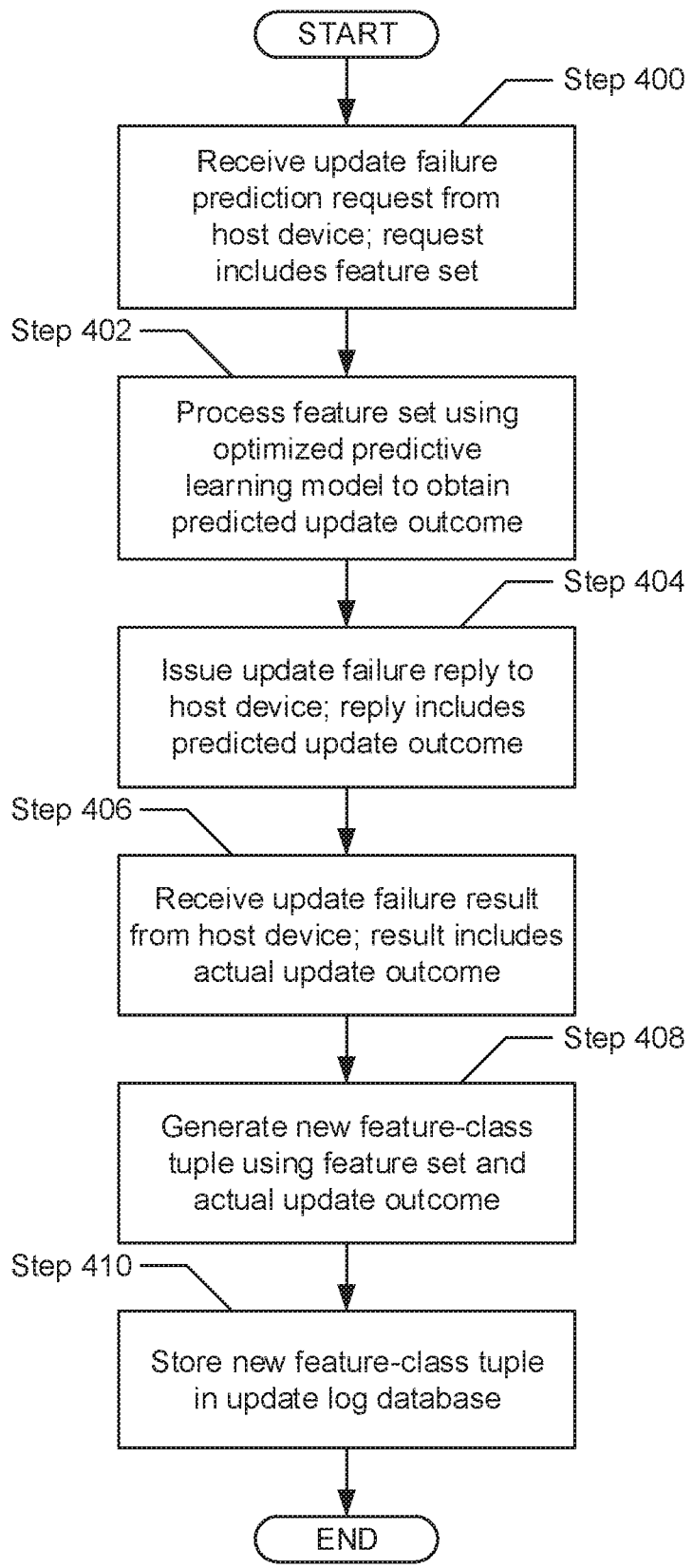
FIG. 4 shows a flowchart describing a method for processing an update failure prediction request in accordance with one or more embodiments of the invention.

FIG. 4 shows a flowchart describing a method for processing an update failure prediction request in accordance with one or more embodiments of the invention. The various steps outlined below may be performed by the update failure predictor (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, an update failure prediction request is received from a host device. In one embodiment of the invention, the update failure prediction request may include a feature set (described above) (see e.g., FIG. 2) pertinent to predicting the installation outcome of a given hardware device update onto the host device.

In Step 402, the feature set (received in Step 400) is processed. Specifically, in one embodiment of the invention, the feature set may be assessed using an optimized predictive learning model (described above) (see e.g., FIG. 3). Further, processing of the feature set, using the optimized predictive learning model, may produce a predicted update outcome (described above) (see e.g., FIG. 2)—i.e., a predicted installation outcome of the hardware device update onto the host device given the feature set.

In Step 404, in response to the update failure prediction request (received in Step 400), an update failure reply is issued. Accordingly, in one embodiment of the invention, the update failure reply may be directed to the host device. Further, the update failure reply may include the predicted update outcome (obtained in Step 402).

In Step 406, in response to the update failure reply (issued in Step 404), an update failure result is received from the host device. In one embodiment of the invention, the update failure result may include an actual update outcome. The actual update outcome (described above) (see e.g., FIG. 2) may refer to the observed installation outcome of the hardware device update onto the host device.

In Step 408, a new feature-class tuple is generated. In one embodiment of the invention, the new feature-class tuple may encompass a finite ordered list (or sequence) of elements. The elements may include, but are not limited to, the feature set (received in Step 400) and the actual update outcome (received in Step 406). Further, the new feature-class tuple may subsequently serve as a learning model training sample and/or testing sample used in future optimizations of the predictive learning model through supervised learning. Accordingly, thereafter, in Step 410, the new feature-class tuple (generated in Step 408) is stored in the update log database (see e.g., FIG. 1).

Figure 5:
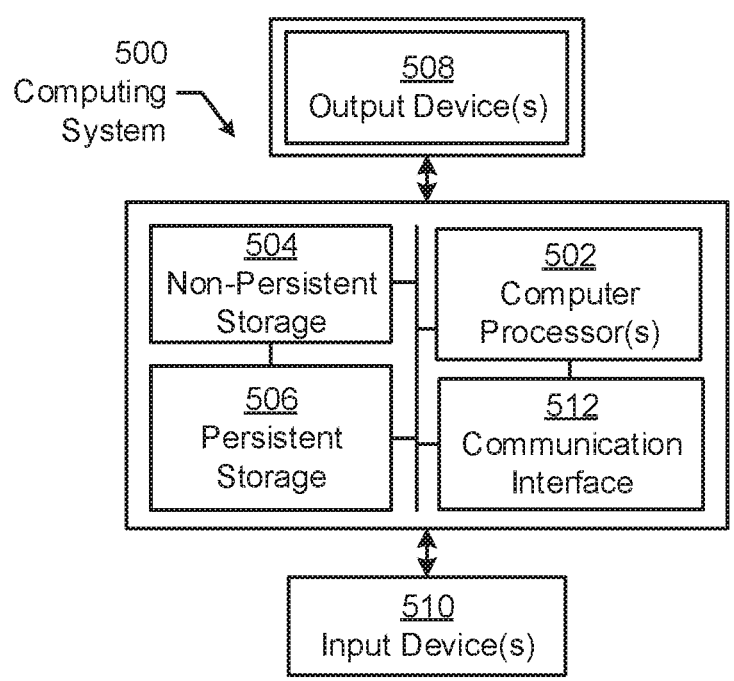
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for installing hardware device updates, comprising:

receiving a first hardware device update concerning a first hardware device on a host device;

submitting a first feature set, pertinent to predicting an installation outcome for the first hardware device update, for processing;

receiving, following the processing, a first predicted update outcome for the first hardware device update; and attempting, based on the first predicted update outcome, an installation of the first hardware device update onto the host device, wherein the first feature set comprises a set of indicator values aggregated from the host device and metadata descriptive of the first hardware device update, the indicator values indicating a design architecture associated with the first hardware device update, the hardware device, one or more dependencies of the hardware device update, and a name associated with a manufacturer for each of the one or more dependencies, and wherein processing of the first feature set comprises using a naïve Bayes classifier as a predictive machine learning algorithm.

2. The method of claim 1, wherein the first hardware device update is one selected from a group consisting of a firmware update applicable to hardware device firmware stored on the first hardware device and a driver update applicable to a hardware device driver stored within a host operating system executing on the host device.

3. The method of claim 1, wherein the first predicted update outcome anticipates a successful installation of the first hardware device update onto the host device.

4. The method of claim 1, further comprising:
obtaining a first actual update outcome observed for the installation of the first hardware device update onto the host device; and
submitting the first actual update outcome for storage.

5. The method of claim 4, wherein the first actual update outcome indicates one selected from a group consisting of a complete and an incomplete, installation of the first hardware device update onto the host device.

6. The method of claim 1, further comprising:
receiving a second hardware device update concerning a second hardware device on the host device;
submitting a second feature set, pertinent to predicting an installation outcome for the second hardware device update, for processing;
receiving, following the processing, a second predicted update outcome for the second hardware device update; and
passing, based on the second predicted update outcome, on an installation of the second hardware device update onto the host device.

7. The method of claim 6, wherein the second predicted update outcome anticipates an unsuccessful installation of the second hardware device update onto the host device.

8. A non-transitory computer readable medium (CRM) comprising computer readable program code, which when executed by a computer processor, enables the computer processor to:
receive a first hardware device update concerning a first hardware device on a host device;
submit a first feature set, pertinent to predicting an installation outcome for the first hardware device update, for processing;
receive, following the processing, a first predicted update outcome for the first hardware device update; and
attempt, based on the first predicted update outcome, an installation of the first hardware device update onto the host device, wherein the first feature set comprises a set of indicator values aggregated from the host device and metadata descriptive of the first hardware device update, the indicator values indicating a design architecture associated with the first hardware device update, the hardware device, one or more dependencies of the hardware device update, and a name associated with a manufacturer for each of the one or more dependencies, and wherein processing of the first feature set comprises using a naïve Bayes classifier as a predictive machine learning algorithm.

9. The non-transitory CRM of claim 8, wherein the first hardware device update is one selected from a group consisting of a firmware update applicable to hardware device firmware stored on the first hardware device and a driver update applicable to a hardware device driver stored within a host operating system executing on the host device.

10. The non-transitory CRM of claim 8, wherein the first predicted update outcome anticipates a successful installation of the first hardware device update onto the host device.

11. The non-transitory CRM of claim 8, comprising computer readable program code, which when executed by the computer processor, further enables the computer processor to:
obtain a first actual update outcome observed for the installation of the first hardware device update onto the host device; and
submit the first actual update outcome for storage.

12. The non-transitory CRM of claim 11, wherein the first actual update outcome indicates one selected from a group consisting of a complete and an incomplete, installation of the first hardware device update onto the host device.

13. A system, comprising:
a plurality of host devices comprising a host device comprising a hardware device; and
an update agent executing on the host device and programmed to:
receive a hardware device update concerning the hardware device;
submit a feature set, pertinent to predicting an installation outcome for the hardware device update, for processing;
receive, following the processing, a predicted update outcome for the hardware device update; and
attempt, based on the predicted update outcome, an installation of the hardware device update onto the host device,
wherein the feature set comprises a set of indicator values aggregated from the host device and metadata descriptive of the hardware device update, the indicator values indicating a design architecture associated with the hardware device update, the hardware device, one or more dependencies of the hardware device update, and a name associated with a manufacturer for each of the one or more dependencies, and
wherein processing of the first feature set comprises using a naïve Bayes classifier as a predictive machine learning algorithm.

14. The system of claim 13, further comprising:
an update failure predictor comprising a computer processor and operatively connected to the plurality of host devices,
wherein the feature set is submitted to and the predicted update outcome is received from the update failure predictor.

* * * * *